No. 832,944. PATENTED OCT. 9, 1906.
S. T. WICKS.
DEHORNING IMPLEMENT.
APPLICATION FILED JAN. 27, 1906.
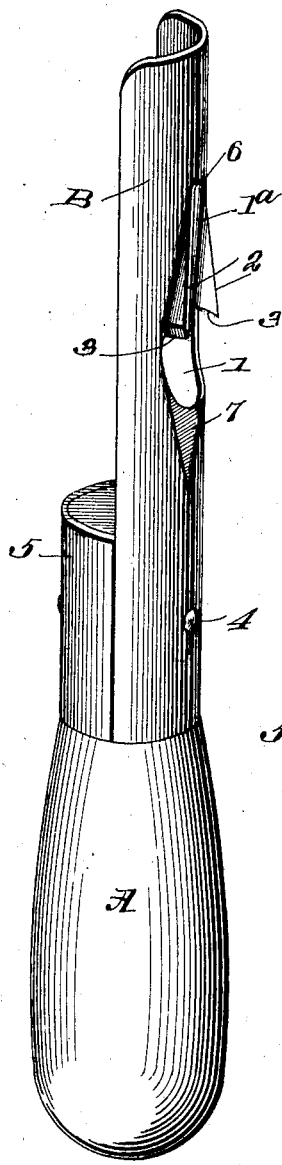
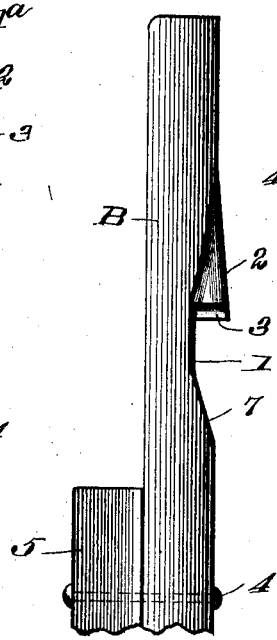
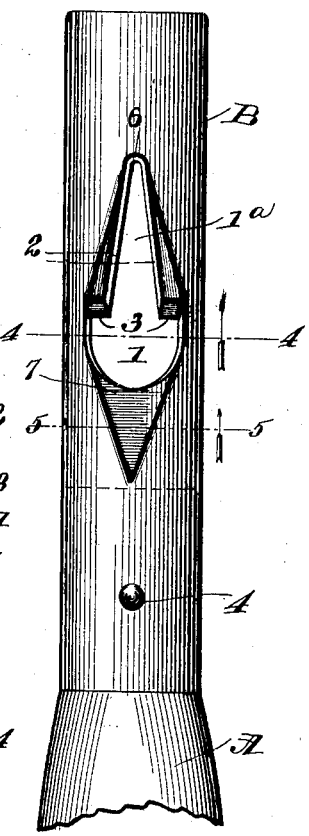
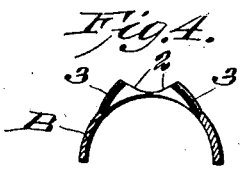
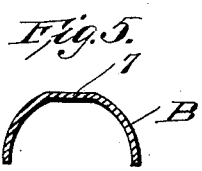
WITNESSES:
E. M. Callaghan
Amos W. Hart
INVENTOR
SAMUEL T. WICKS
BY Munn & Co.
ATTORNEYS

UNITED STATES PATENT OFFICE.

SAMUEL T. WICKS, OF DENVER, COLORADO.

DEHORNING IMPLEMENT.

No. 832,944.  Specification of Letters Patent.  Patented Oct. 9, 1906.

Application filed January 27, 1906. Serial No. 298,177.

*To all whom it may concern:*

Be it known that I, SAMUEL T. WICKS, a citizen of the United States, and a resident of Denver, county of Denver, and State of Colorado, have invented an Improved Dehorning Implement, of which the following is a specification.

My invention is an improvement in that class of dehorning implements which is particularly adapted for dehorning calves or very young cattle and which comprises a blade having opposite and converging cutting edges adapted to make a draw cut in removing the horn.

The details of construction and arrangement and combination of parts embodying my invention are as hereinafter described and claimed, and illustrated in the accompanying drawings, in which—

Figure 1 is a perspective view of the implement. Fig. 2 is a face or plan view of the blade or cutter proper. Fig. 3 is a side view of the same, and Fig. 4 is a cross-section on the line 4 4 of Fig. 2. Fig. 5 is a cross-section on the line 5 5 of Fig. 2.

My improved dehorning implement comprises an enlarged knob-like wooden handle A, adapted to be held firmly in the hand, and a cutter or cutting-blade B, which is constructed of a plate having the form of a segment of a hollow cylinder and provided with an opening 1, large enough to receive a horn, and cutters 2 3, whose construction and arrangement are as follows: A V-shape slot $1^a$ leads from the enlarged opening 1 in the direction of the length of the plate B and away from the handle A. The edges of the plate which border this slot are bent gradually downward from the closed end of the slot $1^a$ to open end of same, so that they stand out at a considerable angle to the body of the plate, but have themselves the shape of a segment of a circle, so that the cutting edges 2 are directly facing each other—that is, the bevel of the sharpened edges 2 lies in a plane parallel to the base of the cross-section 4 4. (See also Figs. 1 and 3.) The ends of these blades or wings (designated 3) are sharpened or beveled like the cutters 2 to form additional cutters. These simply cut the skin away from the base of the horn and make way for the longer blades 2 to follow.

The operation of the implement is as follows: In using the implement the horn to be removed is received into the opening 1, the convex side of the cutter-plate B being nearest the skull of the animal and is pushed down as hard as possible by pressure on the handle A to cause the cutters or cutter-points to sink into the skin at the base of the horn as far as the portion 7 of plate B will allow. The operator then moves the handle from right to left and from left to right, describing a segment of a circle with the handle A in order that the blades 3 will cut the skin away from the horn on the side nearest the handle, making initiatory cuts in which the cutters 2 follow. Then, still continuing a slight right-and-left motion, the operator pulls on the handle, which causes the converging cutters 2 to enter below the base of the horn next to the skull of the animal following the cuts made by the cutters 3, so that as the horn approaches nearer the closed end of the slot the cuts are further deepened until the horn is completely removed, leaving a small concave depression in the skull where the horn was originally rooted.

The flattened portion 7 of the plate B is to govern the depth of the cut made by cutters 2 and 3 and prevent their cutting into the skull proper. The blades 2 of the plate B do not converge to a point exactly as in letter V, but terminate in a small segment of a circle 6, which is displaced downward from the body of the plate sufficiently to permit the portion of the plate bordering thereon to be sharpened by the same operation which sharpened the blades 2. It will be seen that the implement may be easily and quickly sharpened.

By provision of the enlarged opening 1 and the cutters 3, forming one side of the same, the implement operates more effectively and quickly than would be practicable with the V-shape slot alone. In other words, the V-shape slot $1^a$ may be made much shorter by reason of the initiatory side cuts which are made by the cutters 3.

It will be seen that by bending the edges 2 outward and downward, as shown and described, the width or transverse length of the cutting edges 3 is increased to a greater length than would be practicable if the edges 2 conformed to the arc of the segment, or, in other words, if the said edges did not project from the general surface of the plate B. The latter is secured to a reduced cylindrical portion of the handle by means of a rivet 4, a segmental reinforce 5 being applied on the opposite side of the handle, through which the rivet also passes, as shown. It is apparent, however, that various other means of attachment of the cutter to the handle may be substituted.

What I claim is—

1. The improved dehorning implement, comprising a handle, a cutter alined therewith and formed of a plate having a segmental shape and provided with a longitudinal V-shape slot and a laterally-enlarged opening with which said slot communicates, the edges of the plate bordering the slot being bent outward on the convex side of the plate and sharpened to form cutters, and the ends 3 of such cutters being also sharpened so that they are adapted to make initiatory cuts, in the use of the implement, substantially as described.

2. The improved dehorning implement, comprising a handle, and a cutter consisting of a plate having a V-shape slot and a laterally-enlarged opening which communicates therewith, the edge of the plate which borders the opening on the side opposite to the V-shape slot being bent slightly to form a flattened portion which regulates the depth of the cuts made by cutters 2 and 3 as described.

SAMUEL T. WICKS.

Witnesses:
   K. L. WICKS,
   FRANK R. WICKS.